US007962160B2

United States Patent
Hou

(10) Patent No.: US 7,962,160 B2
(45) Date of Patent: Jun. 14, 2011

(54) METHOD, SYSTEM AND SHORT MESSAGE SERVICE CENTER FOR GETTING USER EQUIPMENT INFORMATION THROUGH SHORT MESSAGES

(75) Inventor: Xiaolong Hou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 771 days.

(21) Appl. No.: 11/958,921

(22) Filed: Dec. 18, 2007

(65) Prior Publication Data

US 2008/0125152 A1 May 29, 2008

Related U.S. Application Data

(63) Continuation of application No. PCT/CN2007/000785, filed on Mar. 12, 2007.

(30) Foreign Application Priority Data

Mar. 13, 2006 (CN) .......................... 2006 1 0034433

(51) Int. Cl.
*H04W 4/00* (2009.01)

(52) U.S. Cl. ....................................... 455/466; 455/433

(58) Field of Classification Search ............... 455/412.1, 455/412.2, 413, 414.1–414.4, 426.1, 432.1, 455/433, 435.1, 445, 456.1, 458, 466; 370/328, 370/338, 352, 355, 395.1, 401; 709/206, 709/238
See application file for complete search history.

(56) References Cited

U.S. PATENT DOCUMENTS

| 7,333,823 | B2 * | 2/2008 | Kamphuis ..................... 455/466 |
| 7,428,510 | B2 * | 9/2008 | Titus et al. ...................... 705/39 |
| 7,649,895 | B2 * | 1/2010 | Kadar et al. .................. 370/396 |
| 2002/0077098 | A1 * | 6/2002 | Tiliks et al. ................... 455/426 |
| 2004/0053629 | A1 | 3/2004 | Rueger et al. | |
| 2005/0143076 | A1 | 6/2005 | Machida et al. | |
| 2005/0148350 | A1 | 7/2005 | Kamphuis | |
| 2006/0198508 | A1 * | 9/2006 | Delaney et al. .......... 379/221.12 |

(Continued)

FOREIGN PATENT DOCUMENTS

CN 1351745 A 5/2002

(Continued)

OTHER PUBLICATIONS

Written Opinion from the International Search Authority in corresponding PCT Application No. PCT/CN2007/000785 (Jun. 12, 2007).

(Continued)

*Primary Examiner* — Anthony S Addy
(74) *Attorney, Agent, or Firm* — Leydig, Voit & Mayer, Ltd.

(57) ABSTRACT

A method for getting user equipment information through short messages includes: sending, by a third party service equipment, a request message for inquiring current state information of a user equipment to a short message service center; sending, by the short message service center, a get routing message to a Home Location Register to get the current state information of the user equipment; returning, by the Home Location Register, a get routing message response to the short message service center upon receiving the get routing message, the get routing message response containing the current state information of the user equipment; responding, by the short message service center, to the third party service equipment with the current state information of the user equipment in the getting routing message response.

12 Claims, 4 Drawing Sheets

U.S. PATENT DOCUMENTS

2006/0205419 A1  9/2006  Sohn

FOREIGN PATENT DOCUMENTS

| CN | 1360456 A | 7/2002 |
|---|---|---|
| CN | 1561120 A | 1/2005 |
| CN | 1582046 A | 2/2005 |
| CN | 1662076 A | 8/2005 |
| CN | 1705395 A | 12/2005 |
| CN | 1719939 A | 1/2006 |
| CN | 1741669 A | 3/2006 |
| CN | 100484283 C | 10/2006 |
| GB | 2 378 357 A | 2/2003 |
| WO | WO 2005/001509 A1 | 1/2005 |
| WO | WO 2005004509 A1 | 1/2005 |
| WO | WO 2005/114912 A1 | 12/2005 |

OTHER PUBLICATIONS

Office Action for the European Patent Office in corresponding European Patent Application No. 0770380.0 (Jun. 21, 2010).

"Short Message Peer to Peer Protocol Specification v3.4," Oct. 1999, Issue 1.2, SMPP Developers Forum, Dublin.

"TR-45-PN-3590-Introduction to TIA/EIA-41," Feb. 2001, Telecommunications Industry Association, Arlington, Virgina.

"Short Message Service Centre 4.0—EMI—UCP Interface—Specification," May 2001, CMG Wireless Data Solutions, Addison, TX.

"3GPP; Technical Specification Group Terminals; Technical Realization of the Short Message Service; Release 6," Jun. 2004, $3^{rd}$ Generation Partnership Project, France.

"3GGP; Technical Specification Group Core Network; Mobile Application Part (MAP) Specification; Release 6," Dec. 2003, $3^{rd}$ Generation Partnership Project, France.

Guenther, Roger D. [of Lucent Technologies],"Cellular Radiotelecommunications Intersystem Operations," *Lucent Technologies—Bell Labs Innovations*, TIA/EIA Engineering Standard No. TIA/EIA-41-D, Whippany, New Jersey, Mar. 2004.

$1^{st}$ Office Action in corresponding Chinese Application No. 200720000213.2 (Jan. 18, 2011).

\* cited by examiner

METHOD, SYSTEM AND SHORT MESSAGE SERVICE CENTER FOR GETTING USER EQUIPMENT INFORMATION THROUGH SHORT MESSAGES

This application is a continuation application of PCT application No. PCT/CN2007/000785, filed Mar. 12, 2007, which claims the priority from Chinese patent application No. 200610034433.4, filed with Chinese Patent Office on Mar. 13, 2006.

FIELD OF THE INVENTION

The present invention relates to the field of mobile communication, and particularly to a method and system for getting user equipment information through short messages, and a short message service center.

BACKGROUND OF THE INVENTION

At present, short message is a common data service in the 2G network. Short message is a connectionless service. The sending of a short message includes two independent processes of Mobile Originated (MO) and Mobile Terminated (MT).

With the increasing popularization of mobile phones and the flourishing development of short message service, short message-based services are increasing. At present, mobile operators expect to get, through a short message system, some statues of a user equipment, such as information on the Mobile Switching Center (MSC) to which the user equipment currently belongs, current power on/off state of the user equipment, and International Mobile Subscriber Identity (IMSI) or Mobile Identification Number (MIN) of the user equipment. Upon getting the information, various positioning services such as coarse positioning service, multimedia messaging service and value-added service can be available.

The short message service center may get user equipment information through a get routing message, so as to facilitate the internal processing of the short message service center. At present, the existing short message service center has already been provided with an interface with HLR. Through the short message service center, current state information of the user equipment such as MSC address, SGSN address, the power on/off state, IMSI and MIN may be got.

Taking the GSM network as an example, the processing is generally as follows: the Short Message Service Center (SMSC) sends a get routing message to the Home Location Register (HLR). The get routing message may be a Mobile Terminated Message (MT Deliver message). In this case, the message may be delivered to a mobile terminal, so as to get correct current state information of the mobile terminal. The get routing message may be only a SEND-ROUTING-IN-FOR-FOR-SM (SRI) message with a priority identifier, thereby getting current state information of the mobile terminal without sending the short message to the mobile terminal.

However, the existing short message service center has no open interface and can not provide the obtained current state information of the mobile terminal for a third party for use. In other words, at present, the third party service device can not get user equipment information through the short message service center to perform positioning service.

In addition, although MM5 (reference point between the Multimedia Messaging Server Center and HLR) is defined in the set of Multimedia Messaging protocol, no specific implementation is defined. In other words, in order to implement the multimedia messaging service, an additional positioning system is required.

Further, the user equipment position information can be got by positioning system at present. For example, in the CDMA network, two new network entities shall be added: Mobile Positioning Center (MPC) and Position Determining Entity (PDE). Meanwhile, HLR in the network needs upgrade so as to have the ability of data storage and user equipment position information delivery for user equipment positioning. In the process of positioning, the network first requests the home MPC for the position of a user equipment, the home MPC then gets the address of the serving MPC where the user equipment visits through HLR, and then the home MPC requests the serving MPC for the position of the user equipment. The serving MPC needs to request the mobile switching center serving the user equipment for radio information of the user equipment when it is getting the position information of the user equipment, then the serving MPC interacts with PDE, and the PDE calculates the position of the user equipment. However, such a positioning system is complex in positioning process, has relatively strict requirements in the signaling network, and signaling traffic in which is heavy; furthermore, additional devices are needed, resulting in an overmuch cost and a high risk of investment.

SUMMARY OF THE INVENTION

The present invention is to provide a method and system for getting user equipment information through short messages and a short message service center with low cost and simple implementation.

According to an embodiment of present invention, a method for getting user equipment information through short messages provided in the invention includes:

sending, by a third party service equipment, a request message for inquiring current state information of a user equipment to a short message service center;

sending, by the short message service center, a get routing message to a Home Location Register to get the current state information of the user equipment;

returning, by the Home Location Register, a get routing message response to the short message service center upon receiving the get routing message, the get routing message response containing the current state information of the user equipment;

responding, by the short message service center, to the third party service equipment with the current state information of the user equipment in the getting routing message response.

The system for getting user equipment information through short messages provided in an embodiment of the invention includes a short message service center, a home location register, and a third party service equipment for inquiring user equipment information; the short message service center is adapted to send a get routing message to the home location register to get current information of a user equipment; the home location register is adapted to return a get routing message response containing the current state information of the user equipment to the short message service center upon receiving the get routing message; the system further includes: a communication interface arranged in the short message service center, adapted to receive a request message sent by the third party service equipment for inquiring the current state information of the user equipment and to send a response containing the current state information of the user equipment to the third party service equipment.

The short message service center provided in another embodiment of present invention includes a communication interface, adapted to receive a request message sent by a third party service equipment for inquiring current state information of a user equipment, and to send a response containing the current state information of the user equipment to the third party service equipment.

The advantageous effect of the present invention lie in that by applying the method for getting user equipment information through short messages in the present invention, the current state information on the mobile station can be got through the existing interface between the short message service center and HLR; and by extending the existing communication interface, such information can be provided to a third party service equipment to process the information, without the need of adding additional network entities. The present invention has advantageous of low cost, convenience and simplicity. Furthermore, an MM5 interface is implemented by using this method, thereby facilitating the development of multimedia short message service.

DETAILED DESCRIPTION OF THE INVENTION

Figure 1:
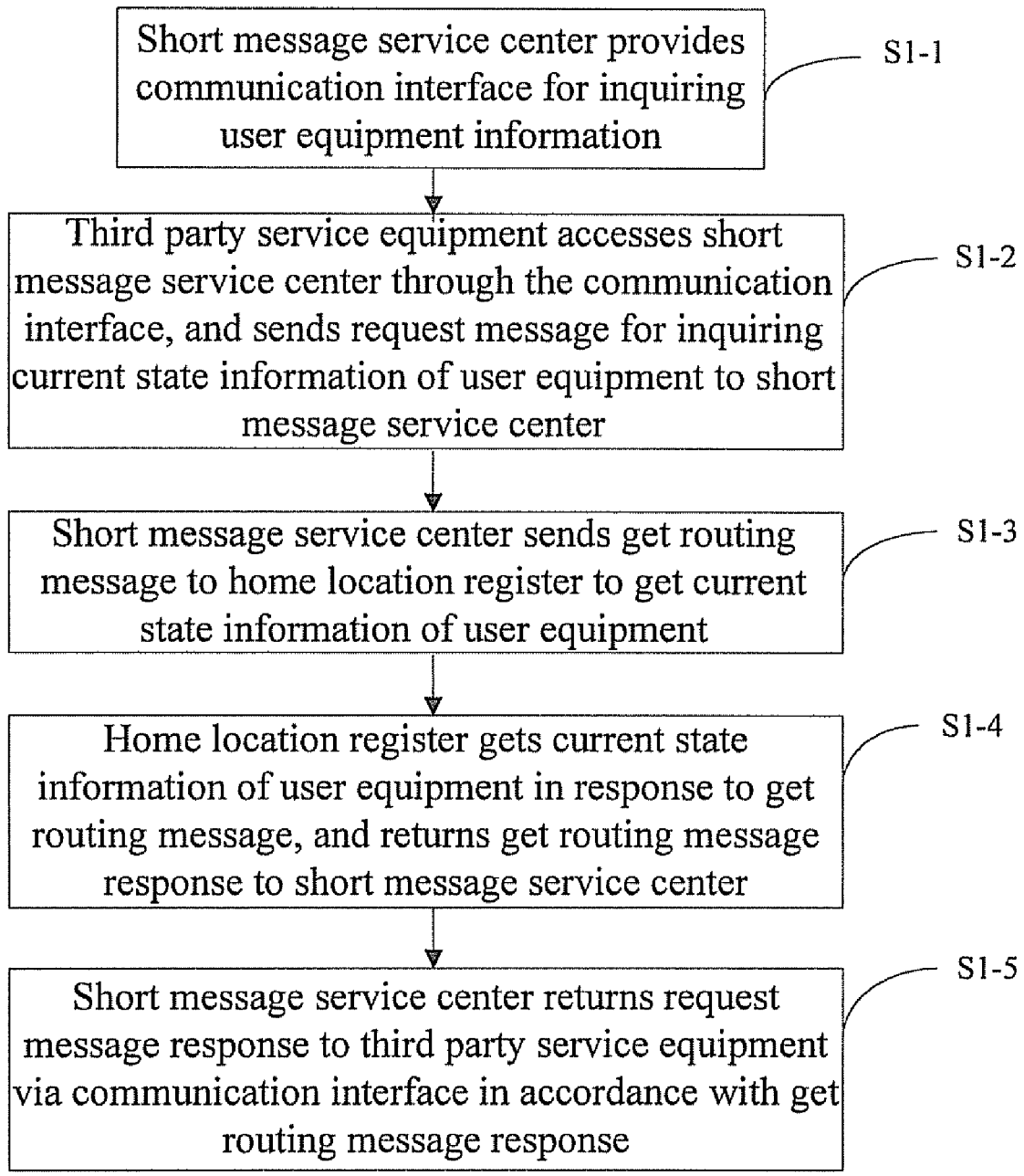
FIG. 1 is a flowchart of a first embodiment for getting user equipment information through short message in the present invention.

A flowchart of a first embodiment for getting user equipment information through short messages in the present invention is shown in FIG. 1. According to the embodiment illustrated in FIG. 1, one short message service center is first set to provide a communication interface for inquiring user equipment information to the outer (S1-1). The communication interface may be a general service protocol interface of a signaling network, with the service protocol including Short Message Peer to Peer (SMPP) protocol, UCP, Short Message Gateway Interface Protocol (SGIP), Short Message Gateway Protocol (SMGP), China Netcom Short Message Gateway Protocol (CNGP) and China Mobile Peer to Peer (CMPP) protocol. Then, a third party service equipment accesses the short message service center through the communication interface and sends a request message for inquiring the current state information of a user equipment to the short message service center (S1-2). Upon receiving the request message, the short message service center sends a get routing message to HLR to get the current state information of the user equipment (S1-3). The HLR gets the current state information of the user equipment in response to the get routing message, and returns a get routing message response containing the current state information of the user equipment to the short message service center (S1-4). The short message service center returns a request message response containing the current state information of the user equipment to the third party service equipment via the communication interface in accordance with the get routing message response (S1-5). The third party service equipment can perform service processing in accordance with the got current state information. The third party service equipment may be a Multimedia Messaging Service Center, in other words, the Multimedia Messaging Service Center can obtain the current state information of a mobile station in HLR through short messages, thereby implementing an MM5 interface. Indeed, in the step S1-5, the short message service center notifies the third party service equipment of the current state information of the user equipment by sending a file containing the current state information of the user equipment to the third party service equipment. In other words, a corresponding file format is defined by the short message service center and the third party service equipment, the short message service center generates a file containing the current state information of the user equipment in a format of the current state information of the user equipment and sends the file to the third party service equipment via the communication interface. Alternatively, in the step S1-5, the short message service center may build an information database in accordance with the current state information of the user equipment, and allow the third party service equipment to access the information database periodically via the communication interface, thereby notifying the third party service equipment of the current state information of the user equipment. In this embodiment, the get routing message may be sent with a get routing command in the form of voice.

The current state information of the user equipment described above includes at least one of information on position, information on power on and off state, and information on code error. For example, in the case of GSM system, the current state information includes IMSI, MSC address, and if the version of the GSM protocol is above PhaseII+, the current state information further includes the current SGSN information of the user equipment; in the case of CDMA system, the current state information includes MIN number, IMSI number, or short message delivery address (SMS_Address) information (which may be MSC address or IP address, etc); error code information when the user equipment is in power off state.

Hereinafter, the method will be further described with an example of GSM network. Indeed, the method is also applicable to a CDMA network, a WCDMA network, a TDMA network, etc.

Figure 2:
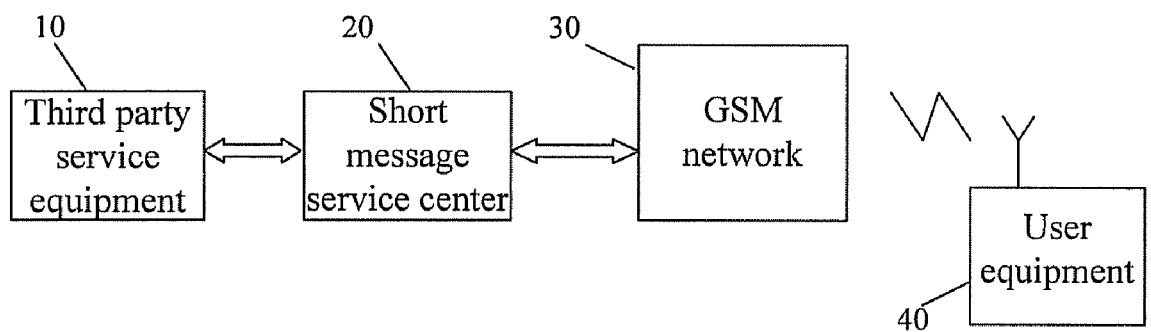
FIG. 2 is a schematic diagram of the networking of the system for getting user equipment information through short message in an embodiment in the present invention.

As shown in FIG. 2, the short message service center 20 provides an SMPP interface to the outer, and the third party equipment 10 (ESME) accesses the short message service center (SMSC) 20 via the SMPP interface. The short message service center 20 accesses the GSM network 30. The user equipment 40 accesses the GSM network 30.

Figure 3:
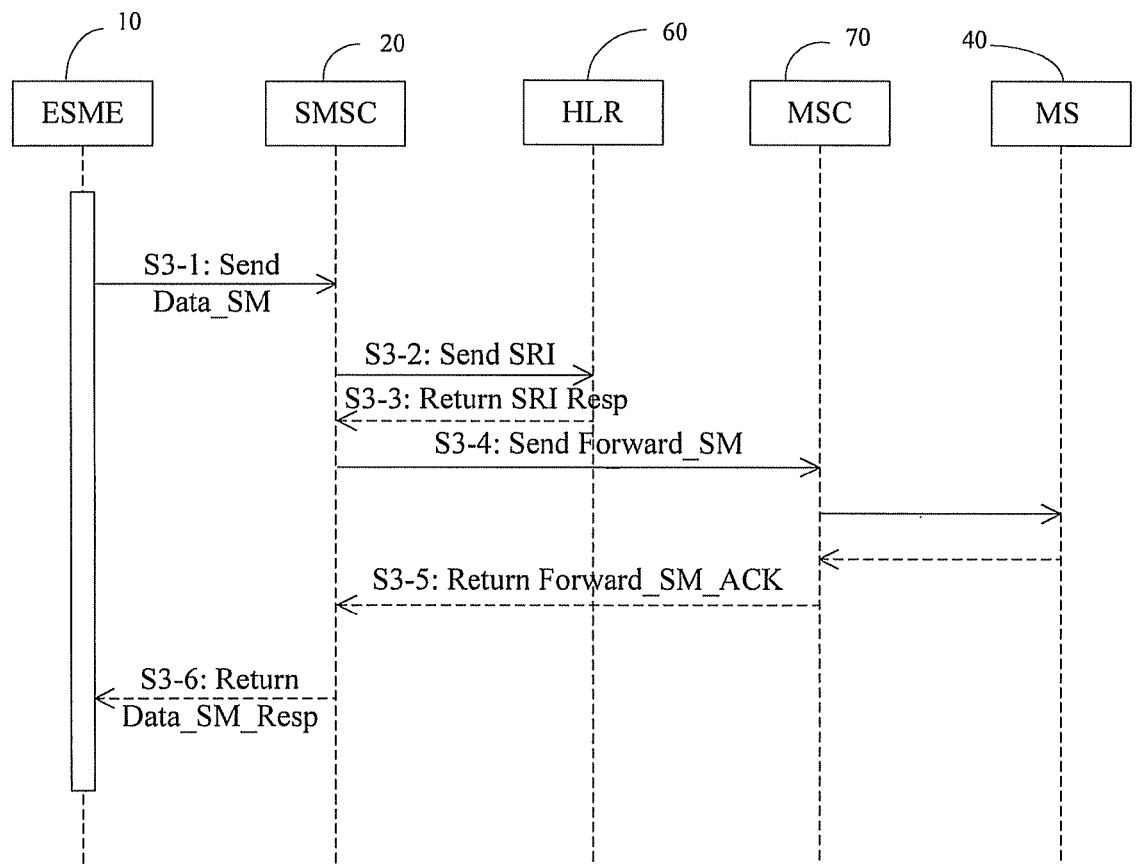
FIG. 3 is a flowchart of a second embodiment for getting user equipment information through short message in the present invention.

If the ESME needs to get the current state information of MS 40 for service processing, as shown in FIG. 3, ESME 10 first submits an interacting message (Data_SM message) to SMSC 20 (S3-1). The Data_SM message carries a field of get terminal routing (get_MTRouting_Information). Here, the value of get_MTRouting_Information is 1, thereby needing the short message service center to deliver a message to user equipment (MS) 40, so as to ensure the correctness of the information in Home Location Register (HLR) 60.

SMSC 20 sends a get routing request (Send routing infor for SM request, i.e. SRI request) to HLR 60 (S3-2). HLR 60 returns a get routing request response (Send routing infor for SM Resp, i.e. SRI Resp) to SMSC 20 (S3-3). The get routing request response contains IMSI, MSC address of MS 40, or the get routing request response further contains SGSN address.

In addition, SMSC 20 sends a delivery message to MS 40 via MSC 70 (S3-4). If MS 40 is in an abnormal state such as power off or memory full, MS 40 or MSC 70 returns code error information to SMSC 20. Particularly, if MS 40 is in power off state, MSC 70 returns code error information to SMSC 20; if MS 40 is in memory full state, MSC 70 returns code error information to SMSC 20, or MS 40 returns code error information to SMSC 20 via MSC 70. If MS 40 is in other abnormal states, for example, the bit error rate of the channel is larger than a set threshold value, then MSC 70 returns code error information to SMSC 20. If MS 40 is in power on state, i.e. a normal state, MS 40 returns a delivery message response to SMSC 20 via MSC 70 (S3-5), particularly, the delivery message response contains current state information of MS 40. SMSC 20 compares the state information got in the step S3-3 with that got in the step S3-4, to obtain the latest state information of MS 40; or SMSC 20 directly replaces the state information got in the step S3-3 with that got in the step S3-4 without comparison. Then SMSC 20 returns a request message response (Data_SM_Resp) to ESME 10 via the communication interface in accordance with the delivery message response (S3-6), particularly, the request message response contains the latest state information of MS 40, thereby enabling ESME 10 to also get the latest state information of MS 40.

Indeed, ESME 10 may request the current state information of MS 40 stored in HLR 60 instead of requesting to deliver a message to MS 40.

Figure 4:
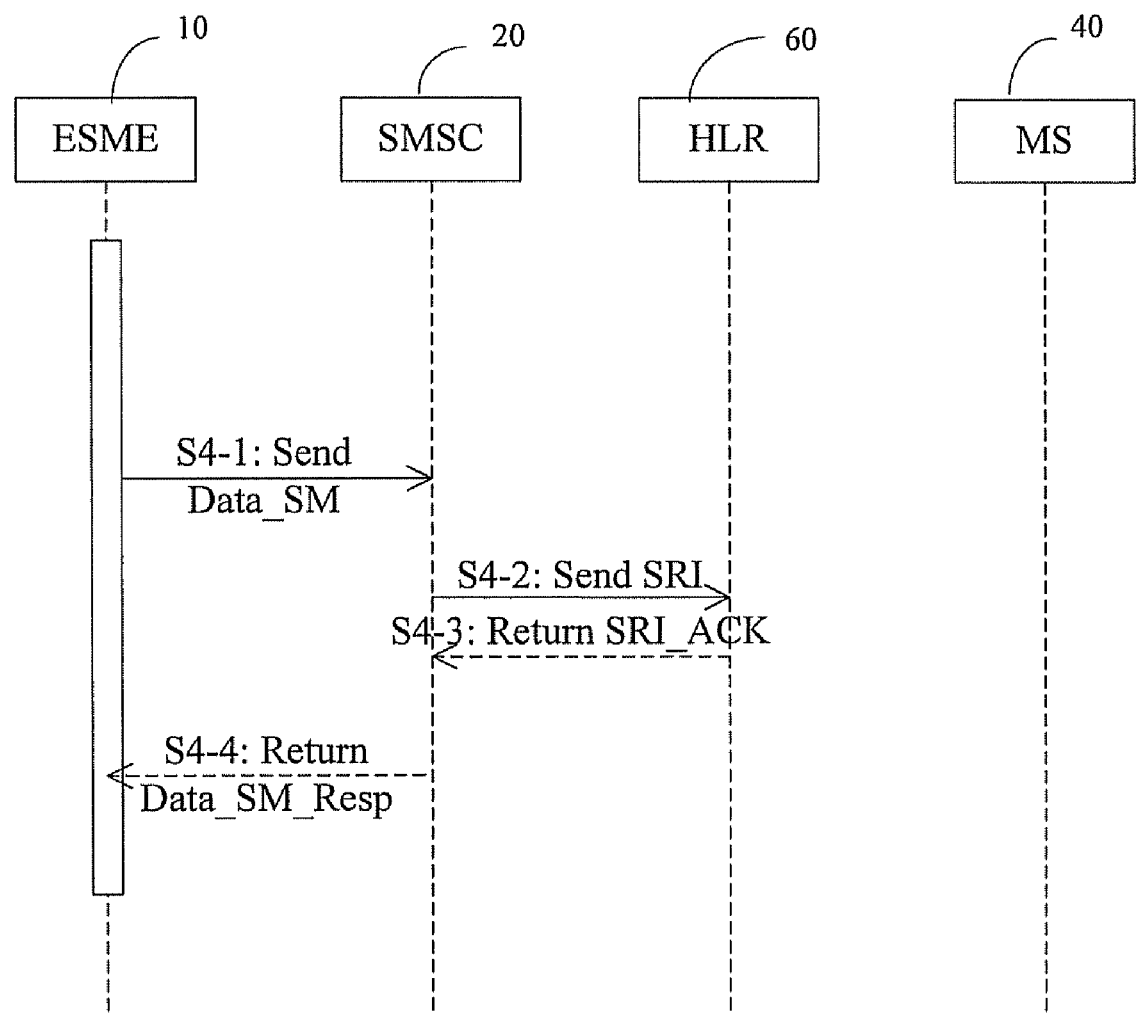
FIG. 4 is a flowchart of a third embodiment for getting user equipment information through short message in the present invention.

As shown in FIG. 4, ESME 10 first sends an interacting message, Data SM (S4-1), carrying fields such as get_MTRouting_Information. Particularly, value "2" of get_MTRouting_Information means getting routing with a low priority, while value "3" of get_MTRouting_Information means getting routing with a high priority. SMSC 20 sends a get routing request (Send routing infor for SM request, i.e. SRI request) to HLR 60 (S4-2), and designates the priority of getting routing as "low priority" or "high priority". HLR 60 returns a get routing request response (SRI_ACK) (S4-3) to SMSC 20, with the get routing request response carrying IMSI, MSC address of MS 40, or further carrying SGSN address of MS 40. SMSC 20 returns a Data SM Response to ESME 10 (S4-4), with the Data SM Response carrying extended MSC address information (MTMSC_Information), SGSN address information (MTSGSN_Information), and returns other state information of MS 40. When MS 40 is in an abnormal state (e.g., power off state or memory full state), in the case of getting routing with a low priority, the returned current state information of MS 40 is code error information; in the case of getting routing with a high priority, the returned current state information of MS 40 is code error information and other state information of MS 40 stored previously in HLR 60, thereby enabling ESME 10 to get the current state information of MS 40.

What is claimed is:

1. A method for getting user equipment information through short messages, comprising:
    receiving, by a short message service center, a request message for inquiring current state information of a user equipment from a third party service equipment;
    sending, by the short message service center, a get routing message to a Home Location Register (HLR) to get the current state information of the user equipment;
    receiving, by the short message service center, a get routing message response from the HLR, the get routing message response containing the current state information of the user equipment;
    sending, by the short message service center, a delivery message to the user equipment via a Mobile Switching Center (MSC);
    receiving, by the short message service center, a delivery message response containing the current state information of the user equipment from the user equipment via the MSC;
    comparing, by the short message service center, the current state information contained in the get routing message response received from the HLR with the current state information contained in the delivery message response received from the user equipment to obtain the latest state information of the user equipment; and
    responding, by the short message service center, to the third party service equipment with the latest state information of the user equipment.

2. The method for getting user equipment information through short messages according to claim 1, wherein the request message for inquiring current state information of a user equipment is an interacting message, and the request message carries a field of get terminal routing.

3. The method for getting user equipment information through short messages according to claim 2, wherein if the user equipment is in an abnormal state, the state information in the delivery message response of the user equipment is error code information; if the user equipment is in a normal state, the state information in the delivery message response of the user equipment is the latest state information.

4. The method for getting user equipment information through short messages according to claim 2, wherein the getting routing message contains a field of priority level.

5. The method for getting user equipment information through short messages according to claim 1, wherein the responding, by the short message service center, to the third party service equipment with the current state information of the user equipment in the delivery message response comprises:
    the short message service center notifying the third party service equipment of the current state information of the user equipment by returning a request message response carrying the current state information of the user equipment to the third party service equipment.

6. The method for getting user equipment information through short messages according to claim 1, wherein the short message service center notifies the third party service equipment of the current state information of the user equipment by sending a file carrying the current state information of the user equipment to the third party service equipment.

7. The method for getting user equipment information through short messages according to claim 1, wherein the short message service center builds an information database in accordance with the current state information of the user equipment, and allows the third party service equipment to access the information database periodically, to notify the third party service equipment of the current state information of the user equipment.

8. The method for getting user equipment information through short messages according to claim 1, wherein the current state information of the user equipment comprises at least one of information on position, information on power on and off state, and information on code error of the user equipment inquired.

9. The method for getting user equipment information through short messages according to claim 1, wherein the short message service center receives the request message via a communication interface of the short message service center.

10. The method for getting user equipment information through short messages according to claim 9, wherein the communication interface is a general service protocol interface of a signaling network, the service protocol comprising Short Message Peer to Peer protocol, UCP, Short Message Gateway Interface Protocol, Short Message Gateway Protocol, China Netcom Short Message Gateway Protocol, and China Mobile Peer to Peer protocol.

11. The method for getting user equipment information through short messages according to claim 1, wherein the get routing message is sent with a get routing command in the form of voice.

12. A system for getting user equipment information through short messages, comprising: a short message service center, a home location register, and a third party service equipment for inquiring user equipment information, wherein the short message service center is adapted to send a get routing message to the home location register (HLR) to get current state information of a user equipment, send a delivery message to the user equipment via a Mobile Switching Center (MSC) and receive a delivery message response containing the current state information of the user equipment from the MSC, compare the current state information contained in a get routing message response received from the HLR with the current state information contained in the delivery message response received from the user equipment to obtain the latest state information of the user equipment;

the home location register is adapted to return the get routing message response containing the current state information of the user equipment to the short message service center upon receiving the get routing message, wherein the system further comprises: a communication interface arranged in the short message service center, adapted to receive a request message sent by the third party service equipment for inquiring the current state information of the user equipment and to send a response containing the latest state information of the user equipment to the third party service equipment.

* * * * *